(12) United States Patent
Chen et al.

(10) Patent No.: US 11,677,091 B2
(45) Date of Patent: Jun. 13, 2023

(54) USE OF QUATERNARY AMMONIUM SALT-TYPE ANTHRAQUINONE-BASED ACTIVE MATERIAL AND SALT CAVERN ORGANIC AQUEOUS REDOX FLOW BATTERY

(71) Applicant: CHINA SALT JINTAN CO., LTD., Jiangsu (CN)

(72) Inventors: Liuping Chen, Jiangsu (CN); Dan Li, Jiangsu (CN); Hui Wang, Jiangsu (CN); Yu Zhao, Jiangsu (CN); Yingzhong Zhu, Jiangsu (CN); Junhui Xu, Jiangsu (CN); Xuqiang Ma, Jiangsu (CN)

(73) Assignee: CHINA SALT JINTAN CO., LTD., Jiangsu (CN)

( * ) Notice: Subject to any disclaimer, the term of this patent is extended or adjusted under 35 U.S.C. 154(b) by 0 days.

(21) Appl. No.: 17/417,380

(22) PCT Filed: Aug. 20, 2020

(86) PCT No.: PCT/CN2020/110215
§ 371 (c)(1),
(2) Date: Jun. 23, 2021

(87) PCT Pub. No.: WO2021/139162
PCT Pub. Date: Jul. 15, 2021

(65) Prior Publication Data
US 2022/0140375 A1 May 5, 2022

(30) Foreign Application Priority Data
Jan. 8, 2020 (CN) .......................... 202010016374.8

(51) Int. Cl.
*H01M 8/18* (2006.01)

(52) U.S. Cl.
CPC ........ *H01M 8/188* (2013.01); *H01M 2250/10* (2013.01); *H01M 2300/0002* (2013.01)

(58) Field of Classification Search
CPC ..... H01M 2250/10; H01M 2300/0002; H01M 8/188; H01M 2300/0091; C07C 213/06
See application file for complete search history.

(56) References Cited

U.S. PATENT DOCUMENTS

2019/0229350 A1* 7/2019 Neuhaus ............. H01M 8/0289

FOREIGN PATENT DOCUMENTS

| CN | 101108795 | 1/2008 |
| CN | 107248585 | 10/2017 |

(Continued)

OTHER PUBLICATIONS

"International Search Report (Form PCT/ISA/210) of PCT/CN2020/110215," dated Nov. 20, 2020, pp. 1-4.

*Primary Examiner* — Brian R Ohara
*Assistant Examiner* — Brent C Thomas
(74) *Attorney, Agent, or Firm* — JCIP Global Inc.

(57) ABSTRACT

The present invention relates to use of a quaternary ammonium salt-type anthraquinone-based active material, and a salt cavern organic aqueous redox flow battery. The quaternary ammonium salt-type anthraquinone-based active material is used as a negative active material in a salt cavern battery, and a quaternary ammonium salt group is introduced, which can improve the solubility of anthraquinone in a neutral sodium chloride solution, thereby increasing the energy density of the battery. Also, the material has a relatively good stability, without the need for charging and discharging under the protection of an inert gas environment.

5 Claims, 9 Drawing Sheets

(56) References Cited

FOREIGN PATENT DOCUMENTS

| CN | 109599577 | 4/2019 | | |
|---|---|---|---|---|
| CN | 110444787 | 11/2019 | | |
| CN | 110446771 | 11/2019 | | |
| CN | 110526826 | 12/2019 | | |
| CN | 111193055 | 5/2020 | | |
| WO | WO-2018032003 A1 * | 2/2018 | ............. | B60L 50/00 |
| WO | 2019076774 | 4/2019 | | |

* cited by examiner

```
┌─────────────────────────────────────────────────────────────┐
│ Dissolving 1,8-dihydroxyanthraquinone,                      │
│ bromoalkyltrimethylammonium bromide, potassium carbonate    │──── S1
│ and potassium iodide into N,N-dimethylformamide with        │
│ stirring for a reaction to obtain a resultant               │
└─────────────────────────────────────────────────────────────┘
                                │
┌─────────────────────────────────────────────────────────────┐
│ Performing a primary suction filtration on the resultant    │
│ after the reaction is completed to obtain a filtrate,       │
│ adding an excess amount of tetrabutylammonium chloride      │──── S2
│ into the filtrate obtained from the primary suction         │
│ filtration, followed by a secondary suction filtration,     │
│ and drying to obtain a product                              │
└─────────────────────────────────────────────────────────────┘
```

FIG. 1

USE OF QUATERNARY AMMONIUM SALT-TYPE ANTHRAQUINONE-BASED ACTIVE MATERIAL AND SALT CAVERN ORGANIC AQUEOUS REDOX FLOW BATTERY

CROSS-REFERENCE TO RELATED APPLICATION

This application is a 371 of international application of PCT application serial no. PCT/CN2020/110215, filed on Aug. 20, 2020, which claims the priority benefit of China application no. 202010016374.8, filed on Jan. 8, 2020. The entirety of each of the above mentioned patent applications is hereby incorporated by reference herein and made a part of this specification.

BACKGROUND

Technical Field

The present invention relates to the technical field of redox flow batteries, and particularly to use of a quaternary ammonium salt-type anthraquinone-based active material and a salt cavern organic aqueous redox flow battery.

Description of Related Art

With the rapid economic development, the accompanying problems such as the environment problem and energy shortage are becoming more and more serious, and have promoted the vigorous development of some clean energy sources such as wind energy, solar energy, and tidal energy. However, due to the discontinuity and instability of these renewable energy sources, their utilization is greatly restricted and the utilization rate is low. Therefore, it is necessary to vigorously develop energy storage technologies to provide guarantee for the stability of the power grid. Among various energy storage technologies, the energy storage technology based on a redox flow battery is the first choice for large-scale energy storage technologies due to its advantages such as large capacity, high safety, and low cost.

Among them, the large-scale energy storage technology based on the redox flow battery involves the storage of a large amount of an electrolyte solution. Generally, the more electricity is stored, the more electrolyte solution is needed, and thus the larger chamber is needed. A salt cavern is an underground cavity left after solution mining of a salt mine by dissolving salts with water in an underground salt bed. At present, the salt cavern has been used to store high-pressure gas, petroleum or the like. The salt cavern has advantages such as a large capacity, a good sealing performance, and a low permeability coefficient, so it can be used for storage of a large amount of an electrolyte solution. However, at present, the more maturely developed redox flow batteries mainly use inorganic electrolytes, such as vanadium redox flow batteries and zinc-bromine redox flow batteries, which have problems such as strong acid systems or relatively high toxicity of active materials, leading to a relatively great impact on the ecological environment. Therefore, it is necessary to develop a redox flow battery suitable for storing an electrolyte solution in an underground salt cavern. In recent years, an organic aqueous redox flow battery is considered to be one of the redox flow batteries having more application prospects, due to its abundant choices of electrolytes and the environmentally friendly and inexpensive neutral aqueous electrolyte solution. However, the solubility of organic active materials in aqueous solutions is limited, and thus it is necessary to individually design active materials for aqueous systems to improve the solubility and energy density thereof.

SUMMARY

The present invention is intended to solve at least one of the technical problems existing in the prior art.

To this end, the present invention provides use of a quaternary ammonium salt-type anthraquinone-based active material, wherein the quaternary ammonium salt-type anthraquinone-based active material can be used in a salt cavern battery to improve its solubility and energy density.

The present invention also provides a salt cavern organic aqueous redox flow battery which has a relatively high energy efficiency.

According to the use of the quaternary ammonium salt-type anthraquinone-based active material according to an embodiment of a first aspect of the present invention, the quaternary ammonium salt-type anthraquinone-based active material is used as a negative active material in a salt cavern battery.

The quaternary ammonium salt-type anthraquinone-based active material according to an embodiment of the present invention can be applied to a salt cavern battery and can be used as a negative active material in the salt cavern battery, wherein by individually designing the active material, a quaternary ammonium salt group is introduced, which can improve the solubility of anthraquinone in a neutral sodium chloride solution, thereby increasing the energy density of the battery.

According to an embodiment of the present invention, a method for preparing the quaternary ammonium salt-type anthraquinone-based active material includes the following steps: step S1 of dissolving 1,8-dihydroxyanthraquinone, bromoalkyltrimethylammonium bromide, potassium carbonate and potassium iodide into N,N-dimethylformamide with stirring for a reaction to obtain a resultant; and step S2 of performing a primary suction filtration on the resultant after the reaction is completed to obtain a filtrate, adding an excess amount of tetrabutylammonium chloride into the filtrate obtained from the primary suction filtration, followed by a secondary suction filtration, and drying to obtain a product.

According to an embodiment of the present invention, the bromoalkyltrimethylammonium bromide in the step S1 has an alkyl chain with n=1, 2, 3, ..., 12.

According to an embodiment of the present invention, a molar ratio of reactants of the 1,8-dihydroxyanthraquinone:bromoalkyltrimethylammonium bromide:potassium carbonate:potassium iodide:N,N-dimethylformamide in the step S1 is 1:2 to 5:2 to 8:0.01 to 0.1:10 to 100.

According to an embodiment of the present invention, the reaction in the step S1 is performed at a reaction temperature of 100° C. to 200° C. for a reaction time of 10 h to 48 h.

According to an embodiment of the present invention, in the step S2, the primary suction filtration is performed on the resultant which is cooled to room temperature after the reaction is completed, and then the secondary suction filtration is performed, followed by vacuum drying to obtain the product.

According to an embodiment of the present invention, the salt cavern organic aqueous redox flow battery includes: an electrolyte solution tank, the electrolyte solution tank being filled with electrolyte solutions; two electrode plates, the two electrode plates being provided in the electrolyte solution tank and being arranged to face each other; and a battery separator, the battery separator being located in the electrolyte solution tank and being configured to separate the electrolyte solution tank into an anode zone in communication with a first electrolyte solution reservoir and a cathode zone in communication with a second electrolyte solution reservoir, wherein a first electrode plate of the two electrode plates is provided in the anode zone and a second electrode plate of the two electrode plates is provided in the cathode zone, the anode zone contains a positive electrolyte solution including a positive active material and the cathode zone contains a negative electrolyte solution including a negative active material, the battery separator is configured to prevent penetration of the positive active material and the negative active material, and the negative active material is the quaternary ammonium salt-type anthraquinone-based active material.

According to an embodiment of the present invention, the positive active material is an organic active molecule.

According to an embodiment of the present invention, the positive active material is selected from a group of bipyridine derivatives, ferrocene and derivatives thereof.

According to an embodiment of the present invention, the positive active material and the negative active material each have a concentration of 0.01 to 4 mol/L.

According to an embodiment of the present invention, the electrolyte solutions include a supporting electrolyte, and the battery separator is configured to be penetrated by the supporting electrolyte.

According to an embodiment of the present invention, the supporting electrolyte includes a single-component neutral salt aqueous solution or a mixed neutral salt aqueous solution.

According to an embodiment of the present invention, the supporting electrolyte is at least one selected from a group consisting of a NaCl salt solution, a KCl salt solution, a $Na_2SO_4$ salt solution, a $K_2SO_4$ salt solution, a $MgCl_2$ salt solution, a $MgSO_4$ salt solution, a $CaCl_2$ salt solution, a $CaSO_4$ salt solution, a $BaCl_2$ salt solution, and a $BaSO_4$ salt solution.

According to an embodiment of the present invention, the battery separator is one selected from a group consisting of an anion exchange membrane, a cation exchange membrane, a permselective membrane, an anion/cation composite exchange membrane, a dialysis membrane and a porous membrane.

According to an embodiment of the present invention, the salt cavern organic aqueous redox flow battery further includes: two electrolyte solution reservoirs that are the first electrolyte solution reservoir and the second electrolyte solution reservoir, the first electrolyte solution reservoir and the second electrolyte solution reservoir being filled with the positive electrolyte solution and the negative electrolyte solution, respectively; circulation pipelines, a first circulation pipeline of the circulation pipelines being configured to deliver the positive electrolyte solution in the first electrolyte solution reservoir into or out of the anode zone, and a second circulation pipeline of the circulation pipelines being configured to deliver the negative electrolyte solution in the second electrolyte solution reservoir into or out of the cathode zone; and circulating pumps, the circulating pumps being provided in the circulation pipelines, respectively, and being configured to respectively supply the electrolyte solutions in a circulation flow.

According to an embodiment of the present invention, the salt cavern organic aqueous redox flow battery has salt caverns each with an underground depth of 100 to 2000 m, a physical volume of 50,000 to 500,000 $m^3$, and a geothermal temperature of 25° C. to 70° C., and the salt caverns each have a solution-mined cavity with a diameter of 40 to 120 m and a height of 60 to 400 m.

According to an embodiment of the present invention, the salt cavern organic aqueous redox flow battery further includes: electrolyte solution outlet pipes, the electrolyte solution outlet pipes being provided at openings of the salt caverns, respectively, wherein lower ends of the electrolyte solution outlet pipes extend below liquid levels of the electrolyte solutions in the salt caverns, respectively, and upper ends of the electrolyte solution outlet pipes are respectively connected to the circulation pipelines to deliver the electrolyte solutions out of the salt caverns through the electrolyte solution outlet pipes, respectively; and electrolyte solution inlet pipes, the electrolyte solution inlet pipes being provided at the openings of the salt caverns, respectively, and sleeved in the electrolyte solution outlet pipes, respectively, wherein lower ends of the electrolyte solution inlet pipes extend toward the electrolyte solutions in the salt caverns, respectively, and upper ends of the electrolyte solution inlet pipes are respectively connected to the circulation pipelines to deliver the electrolyte solutions in the two electrolyte solution reservoirs into the salt caverns, respectively.

According to an embodiment of the present invention, the electrolyte solution outlet pipes and the electrolyte solution inlet pipes each have an inner diameter of 15 m to 60 cm, and an outer diameter of 20 m to 80 cm.

According to use of the salt cavern organic aqueous redox flow battery according to an embodiment of a second aspect of the present invention, the salt cavern organic aqueous redox flow battery is used in energy storage power stations, for peak shaving, emergency power supply, or storage of electrical energy from variable renewable energy sources.

The present invention has the following beneficial effects.

(1) The quaternary ammonium salt-type anthraquinone-based material has a relatively good oxidation mechanism at pH 5-10. Generally, anthraquinone-based materials have a relatively good oxidation mechanism only with the participation of protons in acidic or alkaline environments, but the quaternary ammonium salt-type anthraquinone-based material synthesized according to the embodiments of the present invention has a relatively good oxidation mechanism in a neutral environment and is suitable for a neutral salt solution as a supporting electrolyte, without further adjusting the pH value.

(2) The quaternary ammonium salt-type anthraquinone-based material has a relatively good stability, without the need for charging and discharging under the protection of an inert gas environment. Also, the solubility of the material in the sodium chloride solution is not affected by other ions such as $Ca^{2+}$, $Mg^{2+}$, $SO_4^{2-}$, and $PO_4^{3-}$. Generally, organic systems are relatively sensitive to oxygen in the air and are susceptible to self-discharge in an oxygen environment, and thus during the battery test, they need to be operated under an inert gas environment to improve their discharge capacity. The underground salt cavern is surrounded by the salt bed which contains other impurity ions. In order to prevent the presence of the other ions from affecting the solubility and electrochemical activity of the active material, the influence of some ions on the solubility of the active material is investigated.

The additional aspects and advantages of the present invention will be partly given in the following description, or will partly become obvious from the following description, or will be understood through the practice of the present invention.

BRIEF DESCRIPTION OF THE DRAWINGS

The above and/or additional aspects and advantages of the present invention will become obvious and easy to understand from the description of the embodiments in conjunction with the following accompanying drawings, wherein:

FIG. 1 shows a flowchart of a method for preparing a quaternary ammonium salt-type anthraquinone-based active material according to an embodiment of the present invention.

DESCRIPTION OF THE EMBODIMENTS

Figure 2:
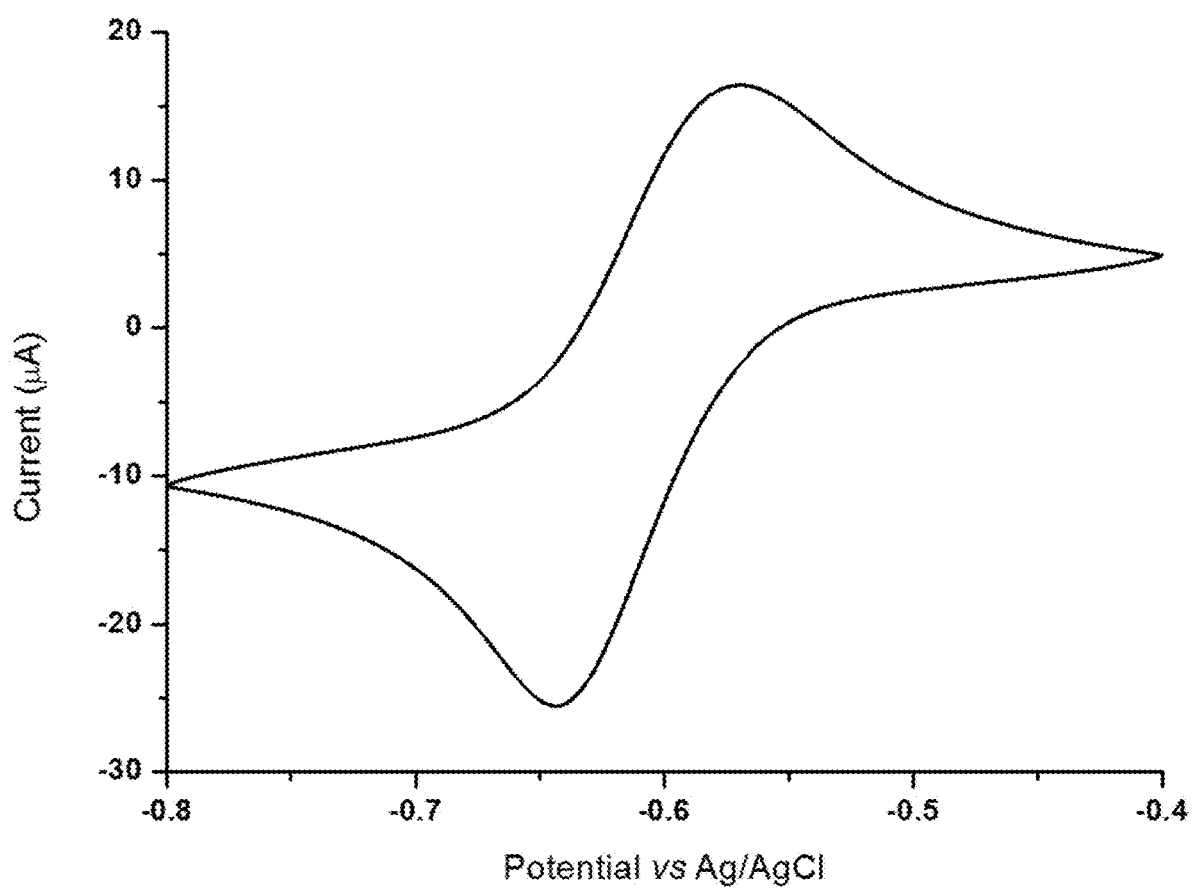
FIG. 2 shows a cyclic voltammogram according to Embodiment 1 of the present invention.

Embodiments of the present invention will be described below in detail. Examples of the embodiments are shown in the accompanying drawings, where the same or similar elements, or elements with the same or similar functions are represented by the same or similar reference numerals throughout. The embodiments described below with reference to the accompanying drawings are exemplary, and are only used to explain the present invention, and should not be construed as limiting the present invention.

In the description of the present invention, it should be understood that the orientation or positional relationship indicated by the terms "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," "circumferential" or the like is based on the orientation or positional relationship shown in the accompanying drawings, and is only for the convenience of describing the present invention and simplifying the description, rather than indicating or implying that the indicated device or element must have a specific orientation, or be configured and operated in a specific orientation, and therefore should not be understood as limiting the present invention. In addition, the features defined by "first" or "second" may explicitly or implicitly include one or more such features. In the description of the present invention, "a plurality of" means two or more, unless otherwise specified.

In the description of the present invention, it should be noted that the terms "installation," "in connection with" and "in connection to" should be understood in a broad sense, unless otherwise clearly specified and limited. For example, they may be fixed connection, detachable connection, or integral connection; or mechanical connection or electrical connection; or direct connection, or indirect connection through an intermediate medium, or internal communication between two elements. For those of ordinary skill in the art, the specific meaning of the above terms in the present invention can be understood under specific circumstances.

Use of a quaternary ammonium salt-type anthraquinone-based active material and a salt cavern organic aqueous redox flow battery according to embodiments of the present invention will be described in detail below with reference to the accompanying drawings.

According to the use of the quaternary ammonium salt-type anthraquinone-based active material according to an embodiment of the present invention, the quaternary ammonium salt-type anthraquinone-based active material is used as a negative active material in a salt cavern battery.

As shown in FIG. 1, in some particular embodiments of the present invention, a method for preparing the quaternary ammonium salt-type anthraquinone-based active material includes the following steps.

Step S1: 1,8-dihydroxyanthraquinone, bromoalkyltrimethylammonium bromide, potassium carbonate and potassium iodide are dissolved into N,N-dimethylformamide (DMF) with stirring for a reaction to obtain a resultant.

Optionally, the bromoalkyltrimethylammonium bromide $(Br-(CH_2)nN^+(CH_3)_3Br^-)$ in the step S1 has an alkyl chain with n=1, 2, 3, . . . , 12.

According to an embodiment of the present invention, a molar ratio of reactants of the 1,8-dihydroxyanthraquinone:bromoalkyltrimethylammonium bromide:potassium carbonate:potassium iodide:N,N-dimethylformamide in the step S1 is 1:2 to 5:2 to 8:0.01 to 0.1:10 to 100.

In some particular embodiments of the present invention, the reaction in the step S1 is performed at a reaction temperature of 100° C. to 200° C. for a reaction time of 10 h to 48 h. That is, 1,8-dihydroxyanthraquinone, bromoalkyltrimethylammonium bromide, potassium carbonate, and potassium iodide are dissolved into N,N-dimethylformamide (DMF) at a predetermined ratio with stirring, and then heated to a predetermined temperature for the reaction.

Step S2: A primary suction filtration is performed on the resultant after the reaction is completed to obtain a filtrate, and an excess amount of tetrabutylammonium chloride is added into the filtrate obtained from the primary suction filtration, followed by a secondary suction filtration, and drying to obtain the product.

Optionally, in the step S2, the primary suction filtration is performed on the resultant which is cooled to room temperature after the reaction is completed, and then the secondary suction filtration is performed, followed by vacuum drying to obtain the product.

Therefore, through the individual synthetic design of the active material, a quaternary ammonium salt group is introduced, which can improve the solubility of anthraquinone in a neutral sodium chloride solution, thereby increasing the energy density of the battery.

The salt cavern organic aqueous redox flow battery according to an embodiment of the present invention includes an electrolyte solution tank, two electrode plates and a battery separator.

Specifically, the electrolyte solution tank is filled with electrolyte solutions. The two electrode plates are provided in the electrolyte solution tank and arranged to face each other. The battery separator is located in the electrolyte solution tank and is configured to separate the electrolyte solution tank into an anode zone in communication with a first electrolyte solution reservoir and a cathode zone in communication with a second electrolyte solution reservoir. A first electrode plate of the two electrode plates is provided in the anode zone and a second electrode plate of the two electrode plates is provided in the cathode zone. The anode zone contains a positive electrolyte solution including a positive active material and the cathode zone contains a negative electrolyte solution including a negative active material. The battery separator is configured to prevent penetration of the positive active material and the negative active material, and the negative active material is the quaternary ammonium salt-type anthraquinone-based active material.

When the quaternary ammonium salt-type anthraquinone-based active material is used as the negative active material for the salt cavern organic aqueous redox flow battery, the introduced quaternary ammonium salt can not only increase the solubility of the material in the aqueous phase, but also avoid the change in solubility caused by combining with $Ca^{2+}$ or $Mg^{2+}$ ions.

The salt cavern organic aqueous redox flow battery may further include two current collector plates, and the two electrode plates are arranged opposite to the two current collector plates, respectively.

Further, the positive active material is an organic active molecule.

Optionally, the positive active material is selected from a group of bipyridine derivatives, ferrocene and derivatives thereof, and the like.

According to an embodiment of the present invention, the positive active material and the negative active material each have a concentration of 0.01 to 4 mol/L.

In some particular embodiments of the present invention, the electrolyte solutions include a supporting electrolyte, and the battery separator is configured to be penetrated by the supporting electrolyte.

Further, the supporting electrolyte includes a single-component neutral salt aqueous solution or a mixed neutral salt aqueous solution.

Optionally, the supporting electrolyte is at least one selected from a group consisting of a NaCl salt solution, a KCl salt solution, a $Na_2SO_4$ salt solution, a $K_2SO_4$ salt solution, a $MgCl_2$ salt solution, a $MgSO_4$ salt solution, a $CaCl_2$ salt solution, a $CaSO_4$ salt solution, a $BaCl_2$ salt solution, and a $BaSO_4$ salt solution, for example, a high-concentration sodium chloride salt solution.

According to an embodiment of the present invention, the battery separator is one selected from a group consisting of an anion exchange membrane, a cation exchange membrane, a permselective membrane, an anion/cation composite exchange membrane, a dialysis membrane and a porous membrane.

In some particular embodiments of the present invention, the salt cavern organic aqueous redox flow battery further includes two electrolyte solution reservoirs, circulation pipelines and circulating pumps. The two electrolyte solution reservoirs are the first electrolyte solution reservoir and the second electrolyte solution reservoir, the first electrolyte solution reservoir and the second electrolyte solution reservoir being filled with the positive electrolyte solution and the negative electrolyte solution, respectively. A first circulation pipeline of the circulation pipelines is configured to deliver the positive electrolyte solution in the first electrolyte solution reservoir into or out of the anode zone, and a second circulation pipeline of the circulation pipelines is configured to deliver the negative electrolyte solution in the second electrolyte solution reservoir into or out of the cathode zone.

The circulating pumps are provided in the circulation pipelines, respectively, and are configured to respectively supply the electrolyte solutions in a circulation flow.

Optionally, the salt cavern organic aqueous redox flow battery has salt caverns each with an underground depth of 100 to 2000 m, a physical volume of 50,000 to 500,000 m³, and a geothermal temperature of 25° C. to 70° C., and the salt caverns each have a solution-mined cavity with a diameter of 40 to 120 m and a height of 60 to 400 m.

According to an embodiment of the present invention, the salt cavern organic aqueous redox flow battery further includes electrolyte solution outlet pipes and electrolyte solution inlet pipes. The electrolyte solution outlet pipes are provided at openings of the salt caverns, respectively, lower ends of the electrolyte solution outlet pipes extend below liquid levels of the electrolyte solutions in the salt caverns, respectively, and upper ends of the electrolyte solution outlet pipes are respectively connected to the circulation pipelines to deliver the electrolyte solutions out of the salt caverns through the electrolyte solution outlet pipes, respectively. The electrolyte solution inlet pipes are provided at the openings of the salt caverns, respectively, and sleeved in the electrolyte solution outlet pipes, respectively, lower ends of the electrolyte solution inlet pipes extend toward the electrolyte solutions in the salt caverns, respectively, and upper ends of the electrolyte solution inlet pipes are respectively connected to the circulation pipelines to deliver the electrolyte solutions in the two electrolyte solution reservoirs into the salt caverns, respectively.

Further, the electrolyte solution outlet pipes and the electrolyte solution inlet pipes each have an inner diameter of 15 m to 60 cm, and an outer diameter of 20 m to 80 cm.

According to the use of the salt cavern organic aqueous redox flow battery according to an embodiment of the present invention, the salt cavern organic aqueous redox flow battery can be used in large-scale energy storage power stations, for peak shaving, emergency power supply, or storage of electrical energy from variable renewable energy sources.

The preparation of the quaternary ammonium salt-type anthraquinone-based active material and the salt cavern organic aqueous redox flow battery according to the embodiments of the present invention will be described in detail below in combination with the particular embodiments.

Embodiment 1

Preparation of an Anthraquinone-Based Active Material 1,8-Dihydroxyanthraquinone, $Br—(CH_2)_3N^+(CH_3)_3Br^-$, potassium carbonate, and potassium iodide were dissolved into N,N-dimethylformamide (DMF) at a predetermined ratio with stirring, where a molar ratio of the reactants 1,8-dihydroxyanthraquinone:$Br—(CH_2)_3N^+(CH_3)_3Br^-$:potassium carbonate:potassium iodide:DMF was 1:3:5:0.05:50.

These reactants were allowed to react at 140° C. for 24 h to obtain a resultant which was cooled to room temperature after the reaction was completed, and then was subjected to suction filtration to obtain a filtrate. An excess amount of tetrabutylammonium chloride was added into the filtrate obtained after the suction filtration, followed by suction filtration and vacuum drying to obtain the product.

Figure 3:
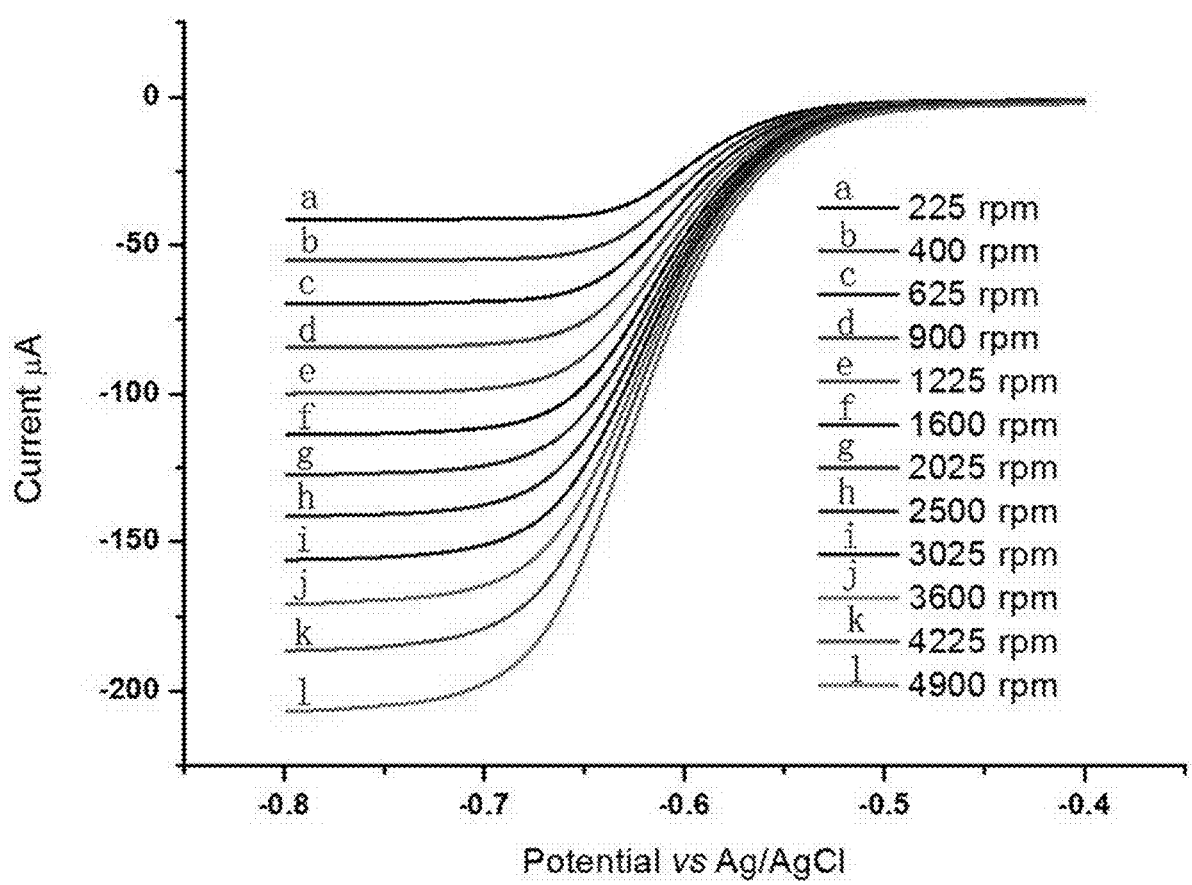
FIG. 3 shows a rotating disk electrode test according to Embodiment 1 of the present invention.
Figure 4:
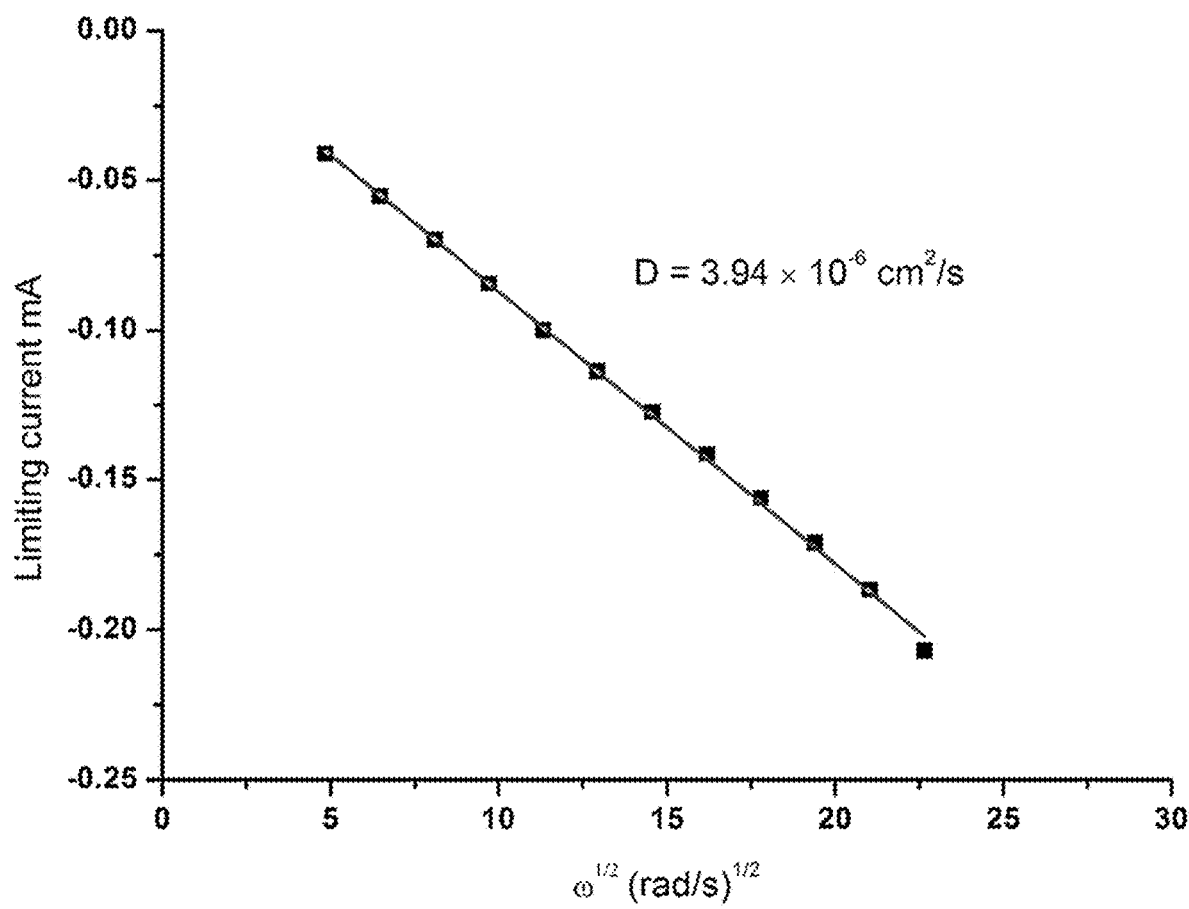
FIG. 4 shows the calculation of the diffusion coefficient of the active material according to Embodiment 1 of the present invention.
Figure 5:
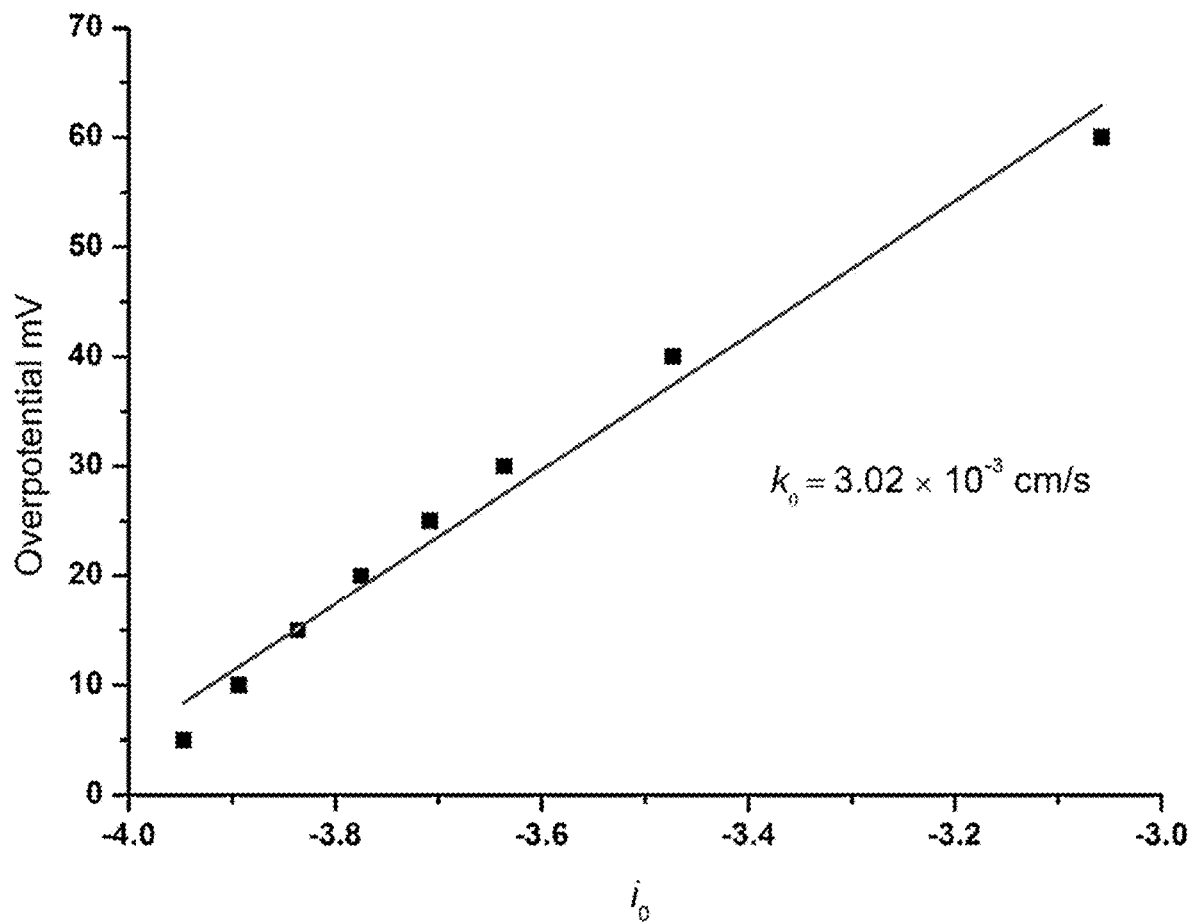
FIG. 5 shows the calculation of the charge transfer rate constant according to Embodiment 1 of the present invention.
Figure 6:
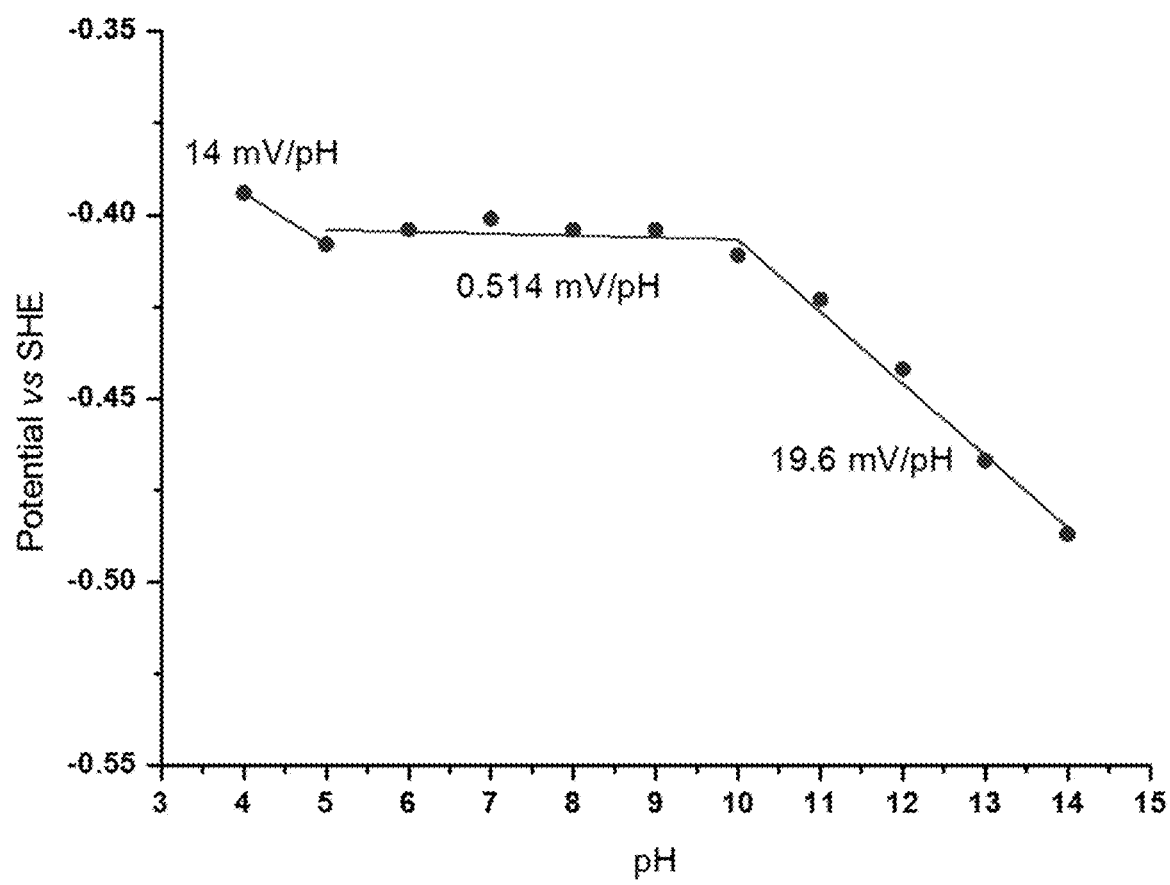
FIG. 6 shows a graph of the potential vs. pH value according to Embodiment 1 of the present invention.
Figure 7:
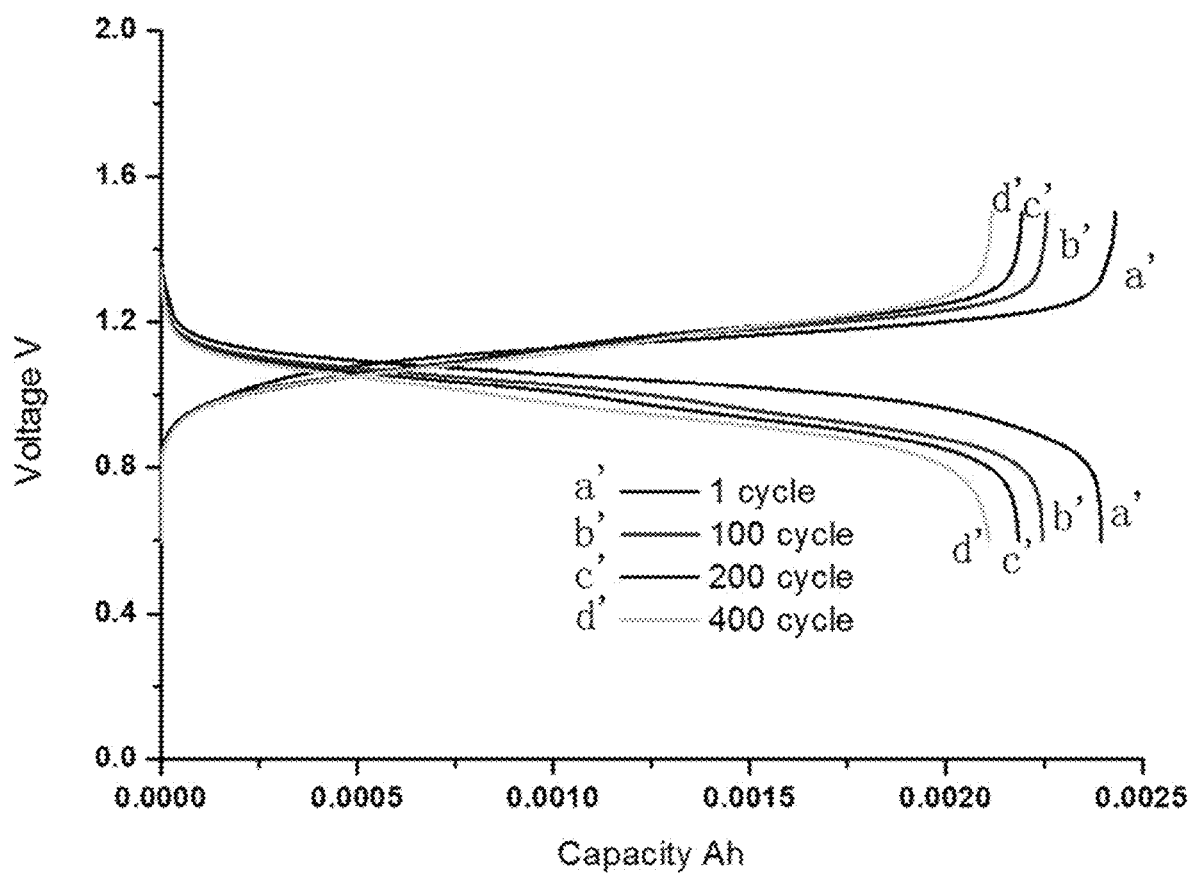
FIG. 7 shows a graph of the charge/discharge voltage vs. capacity according to Embodiment 1 of the present invention.
Figure 8:
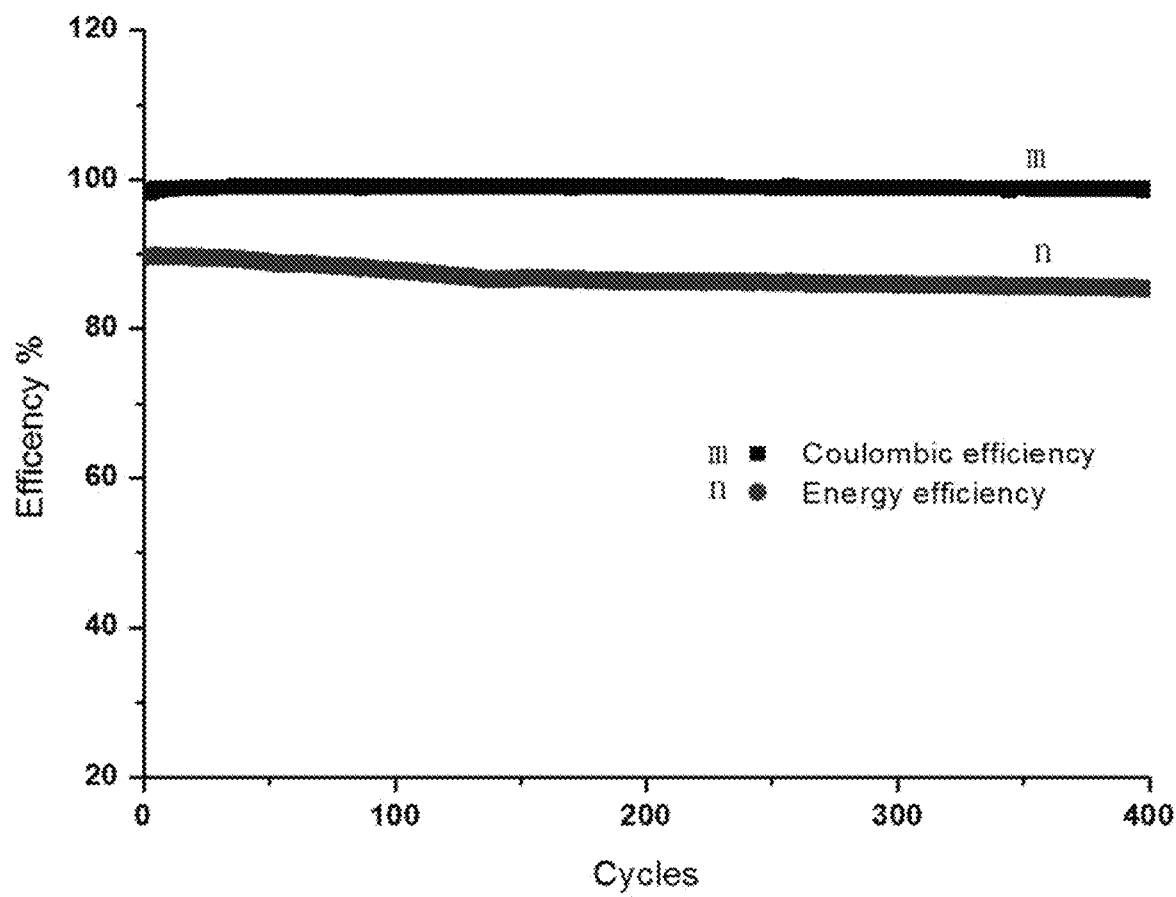
FIG. 8 shows a graph of the battery efficiency vs. cycles according to Embodiment 1 of the present invention.
Figure 9:
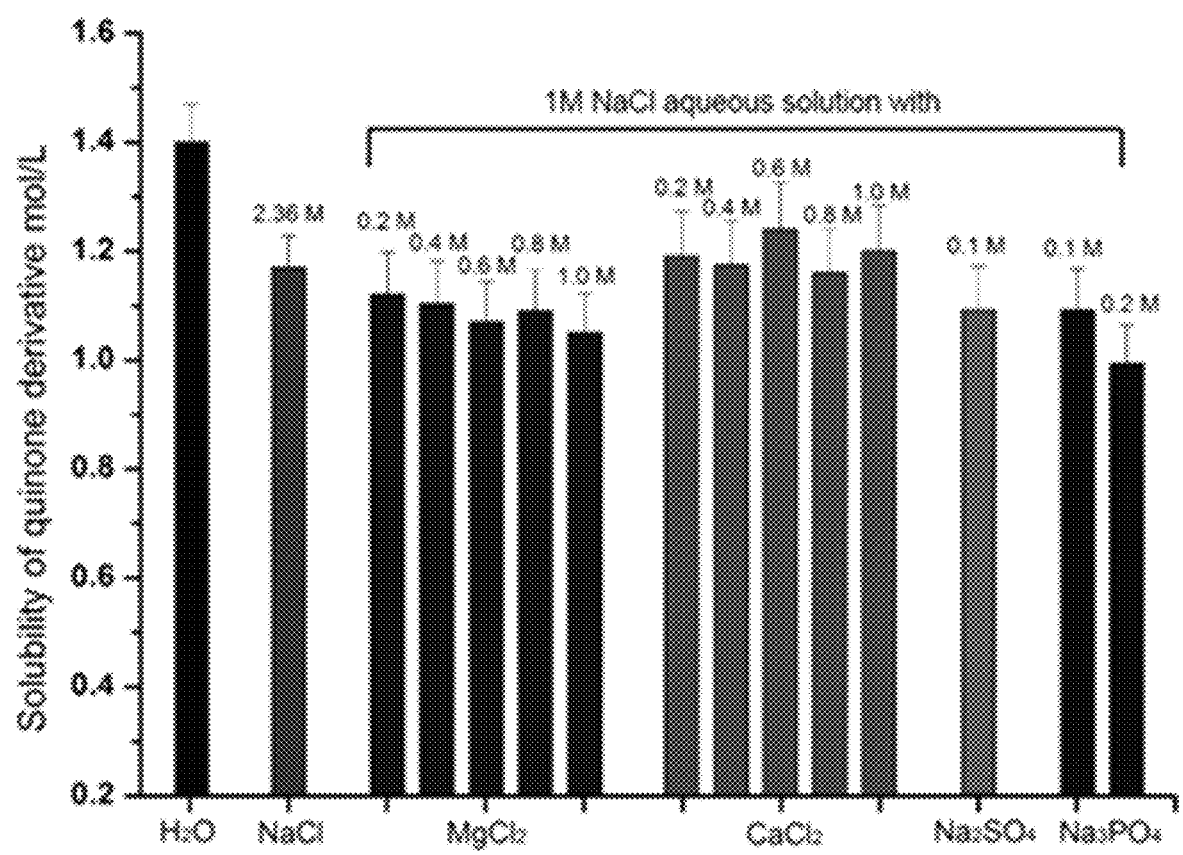
FIG. 9 shows a graph of the solubility according to Embodiment 1 of the present invention.

FIG. 2 to FIG. 9 show the characterization of electrochemical performances of the prepared active material. The prepared quaternary ammonium salt-type anthraquinone-based active material has a diffusion coefficient on a graphite felt electrode of $3.94 \times 10^{-6}$ cm$^2$/s and a charge transfer rate constant of $3.02 \times 10^{-3}$ cm/s.

The synthetic route of the prepared active material may be as shown in the following formula:

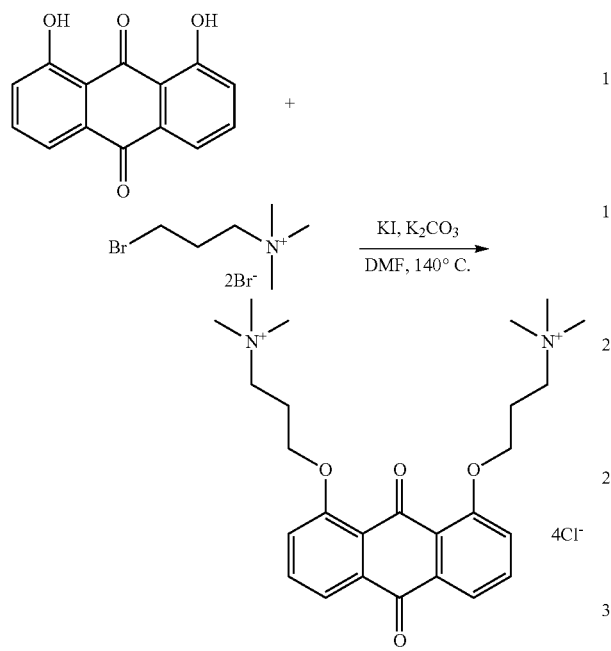

The redox mechanism is shown as follows:

maximum diameter of 60 m, and a geothermal temperature of 30° C. were used as storage tanks for catholyte and anolyte, respectively, and the sleeve had an inner diameter of 20 cm and an outer diameter of 50 cm.

4-hydroxy-2,2,6,6-tetramethylpiperidine-N-oxide (OH-TEMPO) at a concentration of 0.5 mol/L was employed as the anolyte, the quaternary ammonium salt-type anthraquinone-based active material synthesized above at a concentration of 0.5 mol/L was employed as the catholyte, and a 2 mol/L NaCl solution was employed as the supporting electrolyte solution. The electrolyte viscosity was about 10 mPas. Graphite felt electrodes were employed as the positive and negative electrodes, respectively, and a cation exchange membrane was employed as the battery separator. For a single battery stack, at the current density of 10 mA/cm$^2$, the Coulombic efficiency was 99%, the voltage efficiency was 88%, and the energy efficiency was 88%.

Embodiment 2

Preparation of an Anthraquinone-Based Active Material 1,8-Dihydroxyanthraquinone, Br—(CH$_2$)$_2$N$^+$(CH$_3$)$_3$Br$^-$, potassium carbonate and potassium iodide were dissolved into N,N-dimethylformamide (DMF) at a predetermined ratio with stirring, where a molar ratio of the reactants Br—(CH$_2$)$_2$N$^+$(CH$_3$)$_3$Br:potassium carbonate:potassium iodide:DMF was 1:3:6:0.02:60.

These reactants were allowed to react at 160° C. for 20 h to obtain a resultant which was cooled to room temperature after the reaction was completed, and then was subjected to suction filtration to obtain a filtrate. An excess amount of tetrabutylammonium chloride was added into the filtrate obtained after the suction filtration, followed by suction filtration and vacuum drying to obtain the product.

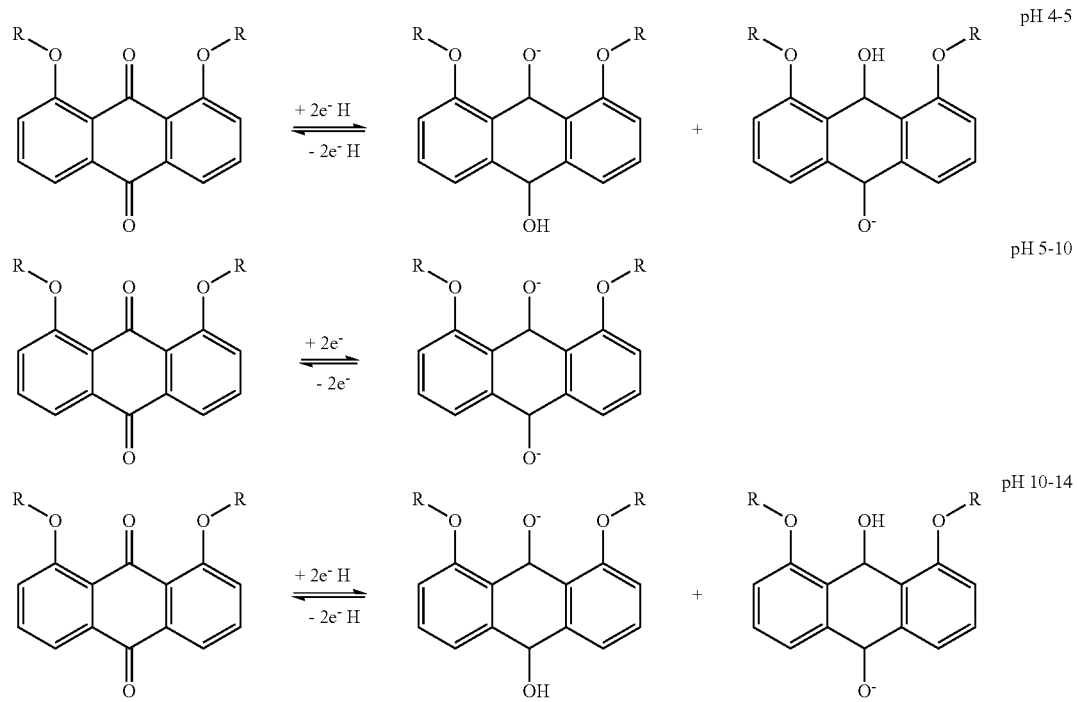

Battery Performance Test

Two salt caverns each with an underground depth of 600 m, a physical volume of 100,000 m$^3$, a height of 80 m, a Battery Performance Test Two salt caverns each with an underground depth of 900 m, a physical volume of 150,000 m$^3$, a height of 120 m, a maximum diameter of 80 m, and a geothermal temperature of 37° C. were used as storage tanks for catholyte and anolyte, respectively, and the sleeve had an inner diameter of 30 cm and an outer diameter of 60 cm.

A quaternary ammonium salt-type ferrocene at a concentration of 0.5 mol/L was employed as the anolyte, the quaternary ammonium salt-type anthraquinone-based active material synthesized above at a concentration of 0.5 mol/L was employed as the catholyte, and a 2 mol/L NaCl solution was employed as the supporting electrolyte solution. The electrolyte viscosity was about 10 mPas. Graphite felt electrodes were employed as the positive and negative electrodes, respectively, and a cation exchange membrane was employed as the battery separator. For a single battery stack, at the current density of 30 $mA/cm^2$, the Coulombic efficiency was 99%, the voltage efficiency was 76%, and the energy efficiency was 75%.

Embodiment 3

Preparation of an Anthraquinone-Based Active Material 1,8-Dihydroxyanthraquinone, Br—$(CH_2)_4$$N^+$$(CH_3)_3$$Br^-$, potassium carbonate and potassium iodide were dissolved into DMF at a predetermined ratio with stirring, where a molar ratio of the reactants Br—$(CH_2)_4$$N^+$$(CH_3)_3$$Br$:potassium carbonate:potassium iodide:DMF was 1:3:5:0.02:80.

These reactants were allowed to react at 180° C. for 18 h to obtain a resultant which was cooled to room temperature after the reaction was completed, and then was subjected to suction filtration to obtain a filtrate. An excess amount of tetrabutylammonium chloride was added into the filtrate obtained after the suction filtration, followed by suction filtration and vacuum drying to obtain the product.

Battery Performance Test

Two salt caverns each with an underground depth of 800 m, a physical volume of 120,000 $m^3$, a height of 100 m, a maximum diameter of 80 m, and a geothermal temperature of 30° C. were used as storage tanks for catholyte and anolyte, respectively, and the sleeve had an inner diameter of 20 cm and an outer diameter of 50 cm.

OH-TEMPO at a concentration of 0.3 mol/L was employed as the anolyte, the quaternary ammonium salt-type anthraquinone-based active material synthesized above at a concentration of 0.3 mol/L was employed as the catholyte, and a 1.5 mol/L NaCl solution was employed as the supporting electrolyte solution. The electrolyte viscosity was about 12 mPas. Graphite felt electrodes were employed as the positive and negative electrodes, respectively, and a cation exchange membrane was employed as the battery separator. For a single battery stack, at the current density of 30 $mA/cm^2$, the Coulombic efficiency was 99%, the voltage efficiency was 76%, and the energy efficiency was 75%.

Embodiment 4

Preparation of an Anthraquinone-Based Active Material 1,8-Dihydroxyanthraquinone, Br—$(CH_2)_6$$N^+$$(CH_3)_3$$Br^-$, potassium carbonate and potassium iodide were dissolved into DMF at a predetermined ratio with stirring, where a molar ratio of the reactants Br—$(CH_2)_6$$N^+$$(CH_3)_3$$Br$:potassium carbonate:potassium iodide:DMF was 1:4:7:0.02:65.

These reactants were allowed to react at 180° C. for 18 h and was cooled to room temperature after the reaction was completed, and then was subjected to suction filtration to obtain a filtrate. An excess amount of tetrabutylammonium chloride was added into the filtrate obtained after the suction filtration, followed by suction filtration and vacuum drying to obtain the product.

Battery Performance Test

Two salt caverns each with an underground depth of 1000 m, a physical volume of 200,000 $m^3$, a height of 140 m, a maximum diameter of 120 m, and a geothermal temperature of 30° C. were used as storage tanks for catholyte and anolyte, respectively, and the sleeve had an inner diameter of 20 cm and an outer diameter of 50 cm.

OH-TEMPO at a concentration of 0.5 mol/L was employed as the anolyte, the quaternary ammonium salt-type anthraquinone-based active material synthesized above at a concentration of 0.5 mol/L was employed as the catholyte, and a 1.2 mol/L NaCl solution was employed as the supporting electrolyte solution. The electrolyte viscosity was about 15 mPas. Graphite felt electrodes were employed as the positive and negative electrodes, respectively, and a cation exchange membrane was employed as the battery separator. For a single battery stack, at the current density of 30 $mA/cm^2$, the Coulombic efficiency was 99%, the voltage efficiency was 76%, and the energy efficiency was 75%.

In summary, when abundant and low-cost anthraquinone-based active materials are used as the negative active material in the electrolyte solution, the introduction of a quaternary ammonium salt group can not only improve the solubility of anthraquinone in a neutral sodium chloride solution and increase the energy density of the battery, but also provide relatively good electrochemical redox properties. The material has a relatively good stability, so the battery does not need to be charged and discharged under the protection of an inert gas environment. The use of a natural salt cavern as an electrolyte solution reservoir has advantages of large capacity, low cost, safety and environmental friendliness, and it is suitable for large-scale energy storage power stations.

In the description of this specification, the description with reference to the terms "an embodiment," "some embodiments," "an exemplary embodiment," "an example," "a particular example" or "some examples" and the like means that the specific features, structures, materials, or characteristics described in conjunction with the embodiment or example are included in at least one embodiment or example of the present invention. In this specification, the illustrative expression of the above terms does not necessarily refer to the same embodiment or example. Moreover, the specific features, structures, materials or characteristics described may be combined in any one or more embodiments or examples in a suitable manner.

Although the embodiments of the present invention have been shown and described, it will be understood by those of ordinary skill in the art that various changes, modifications, substitutions, and variations can be made to these embodiments without departing from the principle and purpose of the present invention. The scope of the present invention is defined by the claims and their equivalents.

What is claimed is:

1. An use of a quaternary ammonium salt-type anthraquinone-based active material, comprising:
    preparing the quaternary ammonium salt-type anthraquinone-based active material, wherein the quaternary ammonium salt-type anthraquinone-based active material is represented by following formula:

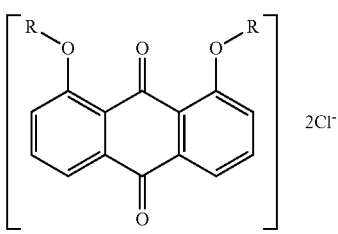

wherein R is —(CH$_2$)$_n$N$^+$(CH$_3$)$_3$, n=2~12, wherein a method for preparing the quaternary ammonium salt-type anthraquinone-based active material comprises the following steps:

step S1: dissolving 1,8-dihydroxyanthraquinone, bromoalkyltrimethylammonium bromide, potassium carbonate and potassium iodide into N,N-dimethylformamide with stirring for a reaction to obtain a resultant; and step S2: performing a primary suction filtration on the resultant after the reaction is completed to obtain a filtrate, adding an excess amount of tetrabutylammonium chloride into the filtrate obtained from the primary suction filtration, followed by a secondary suction filtration, and drying to obtain a product; and using the quaternary ammonium salt-type anthraquinone-based active material to prepare a negative electrolyte solution of a salt cavern battery.

2. The use of the quaternary ammonium salt-type anthraquinone-based active material according to claim 1, wherein the bromoalkyltrimethylammonium bromide in the step S1 has an alkyl chain with n=2~12.

3. The use of the quaternary ammonium salt-type anthraquinone-based active material according to claim 1, wherein a molar ratio of reactants of the 1,8-dihydroxyanthraquinone:bromoalkyltrimethylammonium bromide:potassium carbonate:potassium iodide:N,N-dimethylformamide in the step S1 is 1:2 to 5:2 to 8:0.01 to 0.1:10 to 100.

4. The use of the quaternary ammonium salt-type anthraquinone-based active material according to claim 1, wherein the reaction in the step S1 is performed at a reaction temperature of 100° C. to 200° C. for a reaction time of 10 h to 48 h.

5. The use of the quaternary ammonium salt-type anthraquinone-based active material according to claim 4, wherein in the step S2, the primary suction filtration is performed on the resultant which is cooled to room temperature after the reaction is completed, and then the secondary suction filtration is performed, followed by vacuum drying, to obtain the product.

* * * * *